United States Patent [19]
Gazsi

[11] Patent Number: 5,175,763
[45] Date of Patent: Dec. 29, 1992

[54] TWO-WIRE/FOUR-WIRE CONVERTER

[75] Inventor: Lajos Gazsi, Duesseldorf, Fed. Rep. of Germany

[73] Assignee: Siemens Aktiengesellschaft, Munich, Fed. Rep. of Germany

[21] Appl. No.: 676,197

[22] Filed: Mar. 27, 1991

[30] Foreign Application Priority Data

Mar. 27, 1990 [EP] European Pat. Off. ........ 90105822.2

[51] Int. Cl.$^5$ .............................................. H04B 3/20
[52] U.S. Cl. ..................................... 379/402; 379/345; 379/403; 370/32; 333/119
[58] Field of Search ............... 379/402, 399, 400, 403, 379/404, 405, 345, 410; 370/32; 333/119, 18

[56] References Cited

U.S. PATENT DOCUMENTS

| | | | |
|---|---|---|---|
| 4,161,633 | 7/1979 | Treiber | 379/402 X |
| 4,178,569 | 12/1979 | Reutter et al. | 379/402 X |
| 4,351,060 | 9/1982 | Treiber | 379/402 X |
| 4,381,561 | 4/1983 | Treiber | |
| 4,652,703 | 3/1987 | Lu et al. | 379/410 X |
| 4,757,527 | 7/1988 | Beniston et al. | 379/410 |
| 4,796,296 | 1/1989 | Amada et al. | 379/345 X |

FOREIGN PATENT DOCUMENTS

| | | | |
|---|---|---|---|
| 2847599 | 5/1980 | Fed. Rep. of Germany . | |
| 3141502 | 1/1988 | Fed. Rep. of Germany . | |
| 0151828 | 11/1980 | Japan | 379/345 |
| 0201532 | 11/1984 | Japan | 379/402 |
| 0229995 | 9/1988 | Japan | 379/403 |
| 0318822 | 12/1988 | Japan | 379/402 |
| 0029129 | 1/1990 | Japan | 379/402 |

OTHER PUBLICATIONS

Siemens Forschungs- und Entwicklungsberichte, vl. 5, No. 5, 1986, pp. 253-258; Vogel et al.; "A Signal-Processing Dodec Filter for PCM Applications"; p. 254, left column, line 33.

*Primary Examiner*—James L. Dwyer
*Assistant Examiner*—M. Shehata
*Attorney, Agent, or Firm*—Herbert L. Lerner; Laurence A. Greenburg

[57] ABSTRACT

A communication system has a two-wire communications path carrying analog transmission and reception signals, and a four-wire communications path including a two-wire transmission path carrying digital transmission signals and a two-wire reception path carrying digital reception signals. A two-wire/four-wire converter for coupling the two-wire communications path to the four-wire communications path includes an analog/digital converter having an input coupled to the two-wire communications path and an output. A digital filter has an adjustable communications function for generating a predetermined terminating impedance for the two-wire transmission path. The digital filter has an input connected to the output of the analog/digital converter and an output connected to the two-wire reception path. An adder has one input connected to the two-wire reception path, another input connected to the two-wire transmission path and an output. A subtractor has one input connected to the output of the adder, another input coupled to the output of the analog/digital converter and an output. A digital/analog converter has an input coupled to the output of the substractor and an output coupled to the two-wire communications path. A resistor is connected in parallel with the input of the analog/digital converter.

9 Claims, 1 Drawing Sheet

TWO-WIRE/FOUR-WIRE CONVERTER

The invention relates to a two-wire/four-wire converter for coupling a two-wire communications path carrying analog transmission and reception signals, to a four-wire communications path including a two-wire transmission path carrying digital transmission signals and a two-wire reception path carrying digital reception signals.

In two-wire/four-wire converters, the problem of impedance or apparent resistance adaptation between various lines of different communications paths is well known. For instance, incorrect adaptation causes poor echo damping properties or reflections, which markedly impair the quality of communications. It is especially at a transition from a two-wire communications path to a four-wire communications path that a relatively accurate adaptation between the impedance of the two-wire communications path and a termination impedance formed by the two-wire/four-wire converter is necessary. In that regard, the two-wire/four-wire converters are often also constructed as an interface between analog and digital signals.

In order to adapt the impedances of a two-wire communications path and a two-wire/four-wire converter, passive components were originally used on the analog side for adjusting the required terminating resistor. That meant that additional components, most of them being relatively large in size, were necessary, and adaptation to different line impedances entailed additional expense and effort.

For instance, German Patent DE 31 41 502 C2, corresponding to U.S. Pat. No. 4,381,561 discloses a two-wire/four-wire converter, in which the adaptation is carried out on the digital side by means of a corresponding digital filter. In that known two-wire/four-wire converter, signals received on a two-wire communications path are supplied to an analog/digital converter supplying a digital output signal which is further transmitted to a two-wire reception path. The output signal of the analog/digital converter is added in a digital summation circuit to a signal applied to a two-wire transmission path and delivered to a digital filter. The filter coefficients of the digital filter are variable, for direct adjustment of a desired output impedance. The digital analog signal of the digital filter is converted by a digital/analog converter into an analog signal that in turn is supplied to a voltage/current converter. The output of the voltage/current converter is connected to the two-wire communications path.

In the known two-wire/four-wire converter, constructing the voltage/current converter proves to be difficult. Relatively inexpensive embodiments often have stability problems, while stabler embodiments entail added expense.

It is accordingly an object of the invention to provide a two-wire/four wire converter, which overcomes the hereinafore-mentioned disadvantages of the heretofore-known devices of this general type.

With the foregoing and other objects in view there is provided, in accordance with the invention, in a communication system having a two-wire communications path carrying analog transmission and reception signals, and a four-wire communications path including a two-wire transmission path carrying digital transmission signals and a two-wire reception path carrying digital reception signals, a two-wire/four-wire converter for coupling the two-wire communications path to the four-wire communications path, comprising an analog/digital converter having an input coupled to the two-wire communications path, and an output; a digital filter with an adjustable communications function for generating a predetermined terminating impedance for the two-wire transmission path, the digital filter having an input connected to the output of the analog/digital converter, and an output connected to the two-wire reception path; and adder having one input connected to the two-wire reception path, another input connected to the two-wire transmission path, and an output; a subtractor having one input connected to the output of the adder, another input coupled to the output of the analog/digital converter, and an output; a digital/analog converter having an input coupled to the output of the subtractor, and an output coupled to the two-wire communications path; and a resistor connected in parallel with the input of the analog/digital converter.

In accordance with another feature of the invention, the two-wire communications path has a communications function, and the communications function of the digital filter includes a partial communications function being equal to the communications function of the two-wire communications path, multiplied by the inverse value of the resistance of the resistor.

In accordance with a further feature of the invention, the communications function of the digital filter includes a partial communications function exhibiting OFF-state behavior at a given frequency.

In accordance with an added feature of the invention, the two-wire communications path forms an impedance at a given frequency having a value being greater than the resistance of the resistor by a certain factor.

In accordance with an additional feature of the invention, there is provided a transformer coupling the input of the analog/digital converter and the output of the digital/analog converter to one another and to the two-wire communications path.

In accordance with yet another feature of the invention, the analog/digital converter has a raised sampling rate, and there is provided a sampling rate reducing device connected downstream of the analog/digital converter.

In accordance with yet a further feature of the invention, the digital/analog converter has a raised sampling rate, and there is provided a sampling rate raising device connected upstream of the analog/digital converter.

In accordance with yet an added feature of the invention, the digital filter is a wave digital filter.

In accordance with a concomitant feature of the invention, the digital filter is an adaptive digital filter.

Other features which are considered as characteristic for the invention are set forth in the appended claims.

Although the invention is illustrated and described herein as embodied in a two-wire/four-wire converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
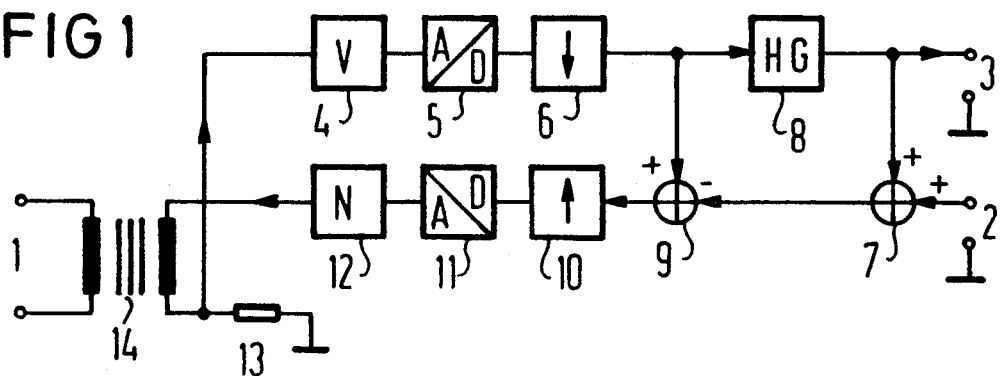
FIG. 1 is a schematic and block circuit diagram of an embodiment of a two-wire/four-wire converter according to the invention.

Referring now to the figures of the drawing in detail and first, particularly, to FIG. 1 thereof, there is seen a two-wire/four-wire converter according to the invention having an analog/digital converter, which includes a preliminary filter 4 with low-pass or bandpass behavior and a following encoder 5. A resistor 13 is connected parallel to an input of the preliminary filter 4. Connected to an output of the encoder 5 which operates with oversampling, is a sampling rate reducing device 6, which lowers the sampling rate of the encoder 5 by a given factor n. For instance, the sampling rate reducing device 6 may include a low-pass filter followed by a switch device that switches only through each $n^{th}$ value. A two-wire reception path 3 is connected to the output of the sampling rate reducing device 6.

The sampling rate reducing device 6 is followed by a digital filter 8 having filter coefficients and thus communications functions which are adjustable in order to generate a predetermined terminating impedance or apparent resistance for a two-wire communications path 1. The communication performance of the digital filter 8 can be expressed by its communications function HG, which in turn is composed of a partial communications function H and a partial communications function G. An output of the digital filter 8 is connected to the two-wire reception path 3. The two-wire/four-wire converter according to the invention also includes an adder 7 having one input which connected to the two-wire reception path 3 and another input which is connected to a two-wire transmission path 2. An output of the adder 7 is carried to one input of a subtractor 9 having another input which is connected to the output of the sampling rate reducing device 6. An output signal of the adder 7 is thus subtracted from the output signal of the sampling rate reducing device 6.

The subtractor 9 is followed by a sampling rate raising device 10, that raises the sampling rate by a given factor, which in this case is again the factor n. The sampling rate raising device 10 includes a repeater device, which delivers a sampling rate n times in succession, as well as a following low-pass filter.

The sampling rate raising device 10 is followed by a digital/analog converter, which includes an oversampling decoder 11 and an afterfilter 12 with low-pass or bandpass behavior. An output of the afterfilter 12 is connected to the input of the preliminary filter 4 through a winding of a transformer 14. The transformer 14 is provided for coupling the two-wire/four-wire converter to the symmetrically constructed two-wire communications path 1.

In order to explain the functioning of the two-wire/four-wire converter according to the invention, a distinction will be made below between two basic modes, namely a reception mode in which a signal appearing on the two-wire communications path 1 is carried to the two-wire reception path 3, and a transmission mode in which a signal appearing on the two-wire transmission path 2 is carried to the two-wire communications path 1. For the remainder of the discussion, the transformer 14, the preliminary filter 4 and the afterfilter 12, the encoder 5, the decoder 11, the sampling rate raising device 10 and the sampling rate reducing device 6 are assumed to be frequency-independent and collectively to have a gain of one.

Figure 2:
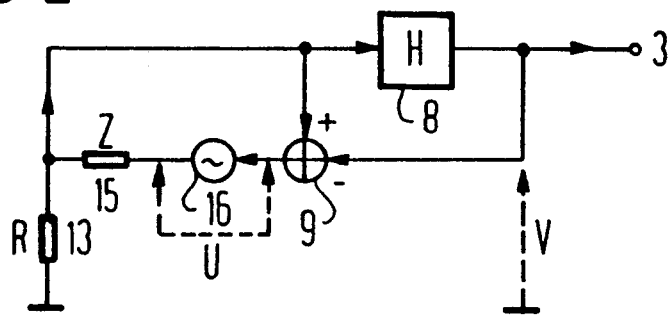
FIG. 2 is a substitute circuit diagram of a two-wire/four-wire converter according to the invention in the reception mode.

In the reception mode, the result is a substitute circuit diagram as shown in FIG. 2. A signal source 16, which is assumed herein to be ideal, emits a signal that is carried through the two wire communications path 1 to the two-wire/four-wire converter. The communications performance of the two-wire communications path 1 and the internal resistance of a non-ideal voltage source and the communications properties of coupling elements, such as the transformer 14, can be described by means of an impedance 15, which has a complex impedance Z. In the two-wire/four-wire converter, the signal emitted by the signal source 16 is then carried both to the digital filter 8 and to the subtractor 9, which subtracts the output signal of the digital filter 8 from this signal. The resistor 13 is connected parallel to the input of the digital filter 8 and the subtractor 9. The output signal of the subtractor 9 is then fed back to the two-wire communications path. With optimal adaptation, in other words with maximum power takeup, the voltage U of the signal source 16 is twice as high as the voltage V at the transfer point to the two-wire/four-wire converter. Assuming a partial communications function G=1, the following relationship is obtained, as a function of the voltage U, the complex resistance Z of the impedance 15, the resistance R of the resistor 13, the complex communications function GH of the digital filter 8, and the voltage V:

$$U/V = (R\ H\ G + Z)/(R\ H\ G) = (R\ H + Z)/(R\ H).$$

The ratio U/V is then equal to exactly 2, if $$H = Z/R.$$

Figure 3:
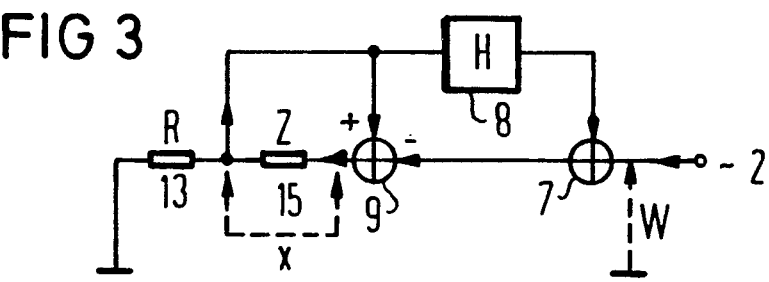
FIG. 3 is a substitute diagram of a two-wire/four-wire converter according to the invention in the transmission mode.

A substitute circuit diagram as shown in FIG. 3 results for the transmission mode. A signal appearing on the two-wire transmission path 2 and having a voltage W, is carried to one input of the adder 7, while the output of the adder 7 is connected to the subtractor 9. The output signal of the subtractor 9 is carried first through the impedance 15 and then to the inputs of the digital filter and the subtractor 9. The resistor 13 is connected parallel to the input of the digital filter 8 and to the input of the subtractor 9. With optimal adaptation, the following relationship exists for the voltage V at the transfer point of the two-wire communications path 1 and the two-wire/four-wire converter:

$$W/x = -2.$$

The ratio W/x can be calculated as $$W/x = -(Z + R\ H\ G)/Z = -(Z + R\ H)/Z.$$

Once again, if H=R/Z, then V=−W/2. From this it then follows that the communications function H of the digital filter 8 equals the communications function of the two-wire communications path 1, multiplied by the inverse value of the resistance of the resistor 13.

In this connection it should be pointed out that wave digital filters are particularly suitable as the digital filters 8, because they assure the stability on the digital side under all circumstances. Adaptive filters are also preferentially used, because they quickly enable the maximum possible adaptation, even to different impedances. Moreover, oversampling encoders and decoders are used in order to hold down the filter expense on the analog side on one hand, and to increase the accuracy of the two-wire/four-wire converters on the other hand.

In telephone communications technology, message unit counting pulses are often transmitted to the telephone subscriber. With the aid of a suitable device, the applicable fees in a given case can then be ascertained from the display or indicator. In order to transmit these counting pulses to the subscriber, alternating current pulses which are predominantly used have a frequency which is either below or above the speech band of 300 to 3400 Hz. The most frequently encountered frequencies that are used are 16 kHz, 12 kHz, and sometimes 50 Hz as well.

Problems arise with counting pulses having a frequency above the speech band. Since counting pulses have to be transmitted from the exchange system to the subscriber over unloaded cables, and the frequencies above the audible range are therefore highly damped, the signal source voltage must be quite high, if it is to drive the fee indicators on the subscriber's telephone. Since the voltage must be dimensioned in such a way that the fee indicator can operate satisfactorily even with the maximum allowable length of the connecting line, a very high voltage is present for telephone subscribers who are located in the immediate vicinity of their particular telephone exchange. As a result, the counting pulses (frequencies of 12 or 16 kHz) may overdrive the input stages of the analog/digital converters of the two-wire/four-wire converters, such as the preliminary filter, and thus interfere considerably with data communications, if the counting pulses are transmitted during the existing connection. For instance, blocks in the form of low-pass filters, which leave speech band signals unaffected and damp the fee pulses, are therefore typically installed in data communications systems. However, additional analog filters entail considerable additional expense.

In the case where a message unit counting pulse is transmitted, the substitute circuit diagram of FIG. 2 applies in principle. However, in this case the digital filter 8 then has a communications function HG, in which the partial communications function H is equal to R/Z, and the partial communications function G is equal to one only in the speech band. In that case, the following equation applies:

$$U/V = (G+1)/G.$$

Then if the partial communications function G is selected in such a way that its value at a given frequency, namely at the frequency of the fee pulse, is less than one, and is approximately equal to one at frequencies in the speech band, or in other words if it exhibits OFF state behavior at the given frequency, then the voltage of the message unit counting pulses is reduced to G/G+1. With suitable sizing, overdriving of the analog/digital converter or of the preliminary filter 4 is avoided.

Figure 4:
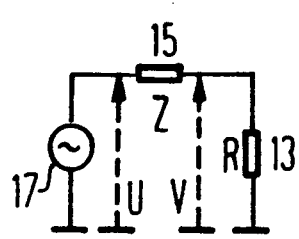
FIG. 4 is a substitute circuit diagram of a two-wire/four-wire converter according to the invention when a message unit counting pulse is transmitted.

Since the two-wire/four-wire converter requires a certain adjustment time because of transit times, the message unit counting pulses can nevertheless overdrive the analog/digital converter or the preliminary filter 4 within that time. In view of this, the resistance of the resistor 13 is selected in such a way that it is less than the resistance of the impedance 15 by a certain factor. In this case, the internal resistance of the digital/analog converter or of the afterfilter 12 should be considered as somewhat on the order of a short circuit. In a substitute diagram which then results as shown in FIG. 4, a voltage divider including the impedance 15 and the resistor 13 is connected to a signal source 17 for the message unit counting pulse. The equation for the voltage V is then:

$$V = R/(R+Z) U.$$

The ratio between the resistance of the resistor 13 and the resistance of the impedance 15 is accordingly selected in such a way that the voltage V does not overdrive the analog/digital converter or the preliminary filter 4.

I claim:

1. In a communication system having a two-wire communications path carrying analog transmission and reception signals, and a four-wire communications path including a two-wire transmission path carrying digital transmission signals and a two-wire reception path carrying digital reception signals, a two-wire/four-wire converter for coupling the two-wire communications path to the four-wire communications path, comprising:

an analog/digital converter having an input coupled to the two-wire communications path, and an output;

a digital filter with an adjustable communications function for generating a predetermined terminating impedance for the two-wire transmission path, said digital filter having an input connected to the output of said analog/digital converter, and an output connected to the two-wire reception path;

an adder having one input connected to the two-wire reception path, another input connected to the two-wire transmission path, and an output;

a subtractor having one input connected to the output of said adder, another input coupled to the output of said analog/digital converter, and an output;

a digital/analog converter having an input coupled to the output of said subtractor, and an output coupled to the two-wire communications path; and a resistor connected in parallel with the input of said analog/digital converter.

2. The two-wire/four-wire converter according to claim 1, wherein the two-wire communications path has a communications function, and the communications function of said digital filter includes a partial communications function being equal to the communications function of the two-wire communications path, multiplied by the inverse value of the resistance of said resistor.

3. The two-wire/four-wire converter according to claim 1, wherein the communications function of said digital filter includes a partial communications function exhibiting OFF-state behavior at a given frequency.

4. The two-wire/four-wire converter according to claim 1, wherein the two-wire communications path forms an impedance at a given frequency having a value being greater than the resistance of said resistor by a certain factor.

5. The two-wire/four-wire converter according to claim 1, including a transformer coupling the input of said analog/digital converter and the output of said digital/analog converter to one another and to the two-wire communications path.

6. The two-wire/four-wire converter according to claim 1, wherein said analog/digital converter has a raised sampling rate, and including a sampling rate reducing device connected downstream of said analog/digital converter.

7. The two-wire/four-wire converter according to claim 1, wherein the digital/analog converter has a raised sampling rate, and including a sampling rate raising device connected upstream of said analog/digital converter.

8. The two-wire/four-wire converter according to claim 1, wherein said digital filter is a wave digital filter.

9. The two-wire/four-wire converter according to claim 1, wherein said digital filter is an adaptive digital filter.

* * * * *